United States Patent [19]

Carr

[11] Patent Number: 4,579,300
[45] Date of Patent: Apr. 1, 1986

[54] INTERNAL WING AIRCRAFT

[76] Inventor: Robert J. Carr, 1023 W. Churchhill Way, Mustang, Okla. 73064

[21] Appl. No.: 330,216

[22] Filed: Dec. 14, 1981

[51] Int. Cl.⁴ .............................................. B64C 39/10
[52] U.S. Cl. ..................................... 244/12.1; 244/36; 244/53 B; 244/13
[58] Field of Search ................. 244/13, 15, 12.1, 12.5, 244/23 R, 23 D, 52, 53 R, 53 B, 34 R, 34 A, 207, 36

[56] References Cited

U.S. PATENT DOCUMENTS

| | | | |
|---|---|---|---|
| 2,553,443 | 5/1951 | Davis | 244/12.1 |
| 2,758,805 | 8/1956 | Graham | 244/52 |
| 2,973,921 | 3/1961 | Price | 244/12.5 |
| 3,027,118 | 3/1962 | Willox | 244/53 B |
| 3,154,267 | 10/1964 | Grant | 244/207 |
| 3,161,379 | 12/1964 | Lane | 244/53 B |
| 3,258,206 | 6/1966 | Simonson | 244/12.5 |
| 3,265,331 | 8/1966 | Miles | 244/53 B |
| 3,568,694 | 5/1968 | Johnson | 244/53 B |
| 3,991,782 | 11/1976 | Schwarzler | 244/53 B |
| 4,296,900 | 10/1981 | Krall | 244/207 |

FOREIGN PATENT DOCUMENTS

| | | | |
|---|---|---|---|
| 1155513 | 5/1958 | France | 244/34 A |
| 1175936 | 4/1959 | France | 244/12.1 |

Primary Examiner—Galen L. Barefoot
Attorney, Agent, or Firm—Head, Johnson & Stevenson

[57] ABSTRACT

An aircraft having a fuselage provided with an internal duct extending longitudinally therethrough to provide an internal wing for the craft, the internal duct having the forward end open for receiving an air stream therethrough and the aft end thereof open for discharge of the air stream therefrom, the internal contour of the duct being alterable in accordance with required operational conditions for the flight of the craft, and a plurality of control flaps and/or vanes provided at the aft end of the duct for proving operational controls for the craft in the manner of a more conventional external wing craft.

9 Claims, 15 Drawing Figures

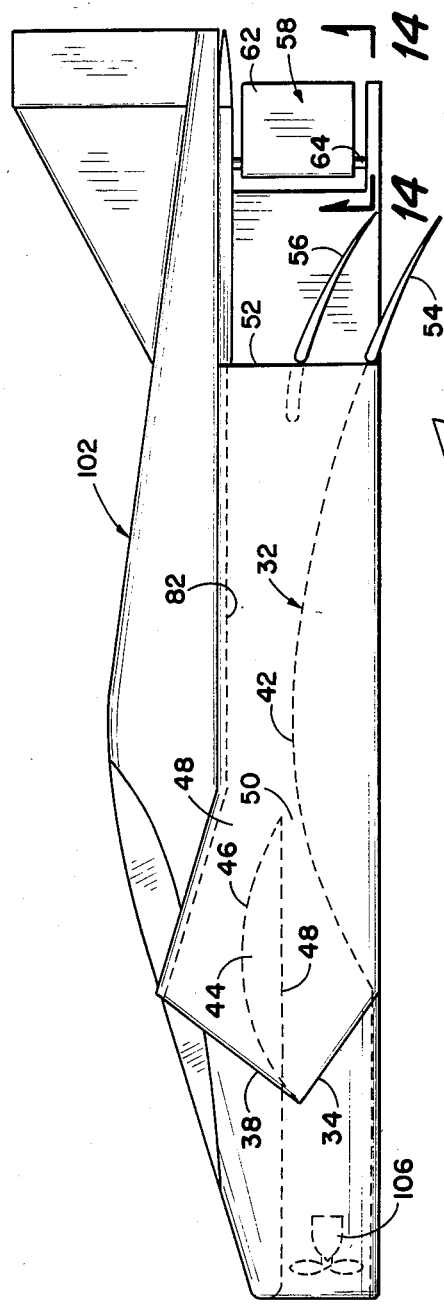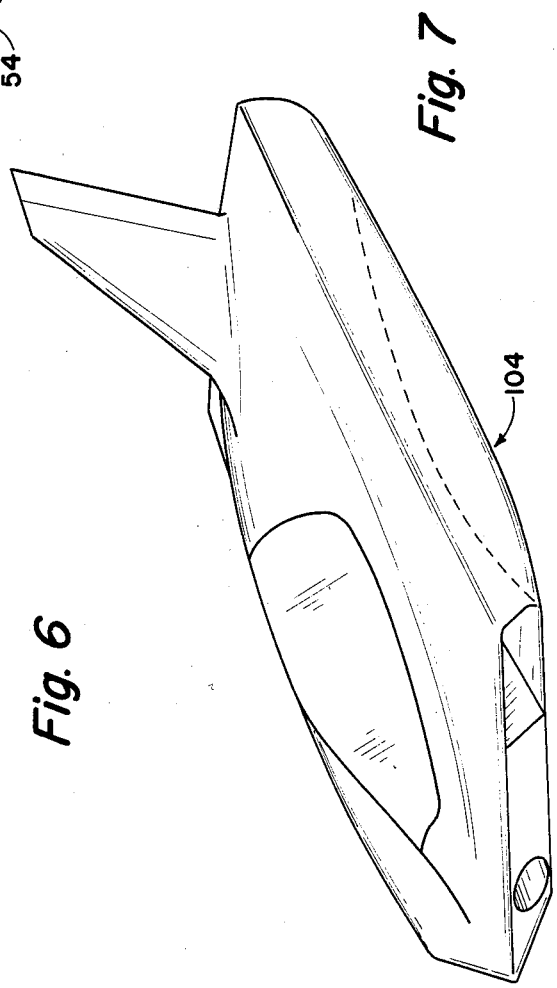

INTERNAL WING AIRCRAFT

CROSS-REFERENCE TO RELATED APPLICATION

This application is related to my prior application Ser. No. 092,349, filed Nov. 8, 1979, now abandoned and entitled "INTERNAL WING AIRCRAFT".

BACKGROUND OF THE INVENTION

1. Field of the Invention

This invention relates to improvements in aircraft and more particularly, but not by way of limitation, to an internal wing aircraft.

2. Description of the Prior Art

The usual aircraft of today normally utilizes a wing structure configured to take advantage of the principle that the component of the resultant force normal to the direction of motion of a body through a fluid is many times greater than the component resisting the motion. Generally speaking, and as set forth in "The Elements of Aerofoil and Airscrew Theory" by H. Glauert, and aircraft wing is designed with a plane of symmetry passing through the mid-point of its span, and the direction of motion and the line of action of the resultant force usually lie in this plane. The section of an airfoil by a plane parallel to the plane of symmetry is of an elongated shape, with a rounded leading edge and a fairly sharp trailing edge. The cord line of an airfoil is defined as the line joining the centers of curvature of the leading and trailing edges and the projection of the airfoil section on this line is defined as the chord length. The angle of incidence of an airfoil is defined as the angle between the chord and the direction of motion relative to the fluid through which the body is moving, and the center of pressure of an airfoil is defined as the point in which the line of action of the resultant force intersects the chord. The resultant force is resolved into two components, the lift at right angles to the direction of motion and the drag parallel to that direction but oposing the motion. It is customary to use the leading edge of the chord as a point of reference and the resultant force has a moment about this point, whose sense is such that a positive moment tends to increase the angle of incidence. The velocity of the air streaming over the top surface or an aircraft wing is greater than the velocity of the air streaming over the bottom surface thereof to provide a pressure differential across the wing whereby lift is exerted on the wing to support the aircraft in flight. Of course, there has been a great amount of experimentation to improve aircraft design to achieve both greater flight performance and economy of construction and operation, but there are still many problems existing in the industry.

SUMMARY OF THE INVENTION

The present invention comprises an internal wing aircraft particularly designed and constructed in a manner to overcome much of the present day disadvantages in aircraft design. The novel craft is based on the generation of lift by the action of air moving through a shaped duct. The duct directs the airflow from an inlet at the forward end of the duct to an axis at the aft end of the duct. The movement of the airflow throught the duct and over a contoured section in the duct floor creates a pressure and velocity change in the air stream. The duct shape is such that a lower pressure is created on the lower surface of the duct than is created on the upper surface of the duct. The net difference in the pressure change results in an upward force or lift. This force is controlled by the shape of the duct and by the amount of air that moves through the duct. The configuration of the duct is controlled mechanically to vary the contour and height of the contour above the duct floor. As the airspeed increases through the duct, less curvature height is required to generate the desired vertical force or lift. Conversely, as the airspeed decreases, greater curvature height is required to maintain the desired vertical force. Of course, the duct size must be sufficiently large as to permit the airstream to flow through the contoured section without being overly restricted when the contoured section is configured with the greatest curvature height. Similarly, the size cannot be so large that the airstream is allowed to flow through the duct without being properly influenced by the contoured section. The duct shape and size are dependent on the considerations controlling the detailed design of the actual machine and the mission for which its use is required. The operation of the duct and the contained contoured section provide the characteristics necessary to fulfill the fundamental requirements of producing a lifting force.

The duct extends longitudinally through the fuselage of the aircraft, with the inlet thereof being disposed rearwardly of the power plant of the craft and the outlet open in the proximity of the tail section of the craft. This generally results in a more compact construction for the aircraft than that possible with the more conventional external wing structure. In addition, the use of a duct provides a flexibility in the aircraft design to meet varying flight requirements since the shape of the exterior of the aircraft remains fixed and the contour of the duct is altered in accordance with required flight performance. In other words, changes in performance of the craft may be accomplished by shaping structural members which form the longitudinal chamber of the duct floor, and the effect of such shaping may be determined independently of other factors involved in the overall interaction of the aircraft with the air through which the craft moves. Furthermore, the shaping of the contour of the duct may be accomplished in flight without affecting the structural integrity of the craft as is usually the case where shaping is attempted in an external wing structure. The positioning of the inlet of the duct aft of the aircraft power plant permits a direct utilization of air streams produced by the power plant to provide lift via the forward movement of the aircraft through the air. The utilization of lifting surfaces formed internally of the craft, or in a duct, permits utilization of these air streams to provide a lift whereby the aircraft may be flown at lower speed than normally possible with aircraft provided with external wings.

Pitch control for the aircraft is provided by movable flaps, or the like disposed at the trailed edge or outlet of the duct. When these flaps are operated in conjunction with each other, that is simultaneously in the same direction, they produce a vertical force along the trailing edge of the craft, thus changing the attitude of the craft. The directional control of the aircraft is provided by vertically mounted vanes mounted at the rear of the duct and provide the necessary side force to produce a yawing movement for the craft. For low speed operations, it may be desirable to provide an external vertically disposed control surface to work in conjunction with the vanes at the duct outlet. Rolling control of the craft is accomplished by the provision of a pair of left and right hand control surfaces, with the control surfaces being movable simultaneously, but in opposite directions. This will produce a rolling movement about the longitudinal axis of the aircraft, and modulation of this control mode will enable the pilot of the craft to bank, roll, and otherwise control the action of the craft as in a more conventional aircraft. The novel aircraft is simple and efficient in operation and economical and durable in construction.

BRIEF DESCRIPTION OF THE DRAWINGS

FIG. 5 is a perspective view of a modified aircraft embodying the invention.

FIG. 6 is a side elevational view of still another modified aircraft embodying the invention.

FIG. 7 is a perspective view of a still further modified aircraft embodying the invention.

DETAILED DESCRIPTION OF THE PREFERRED EMBODIMENT

Figure 1:
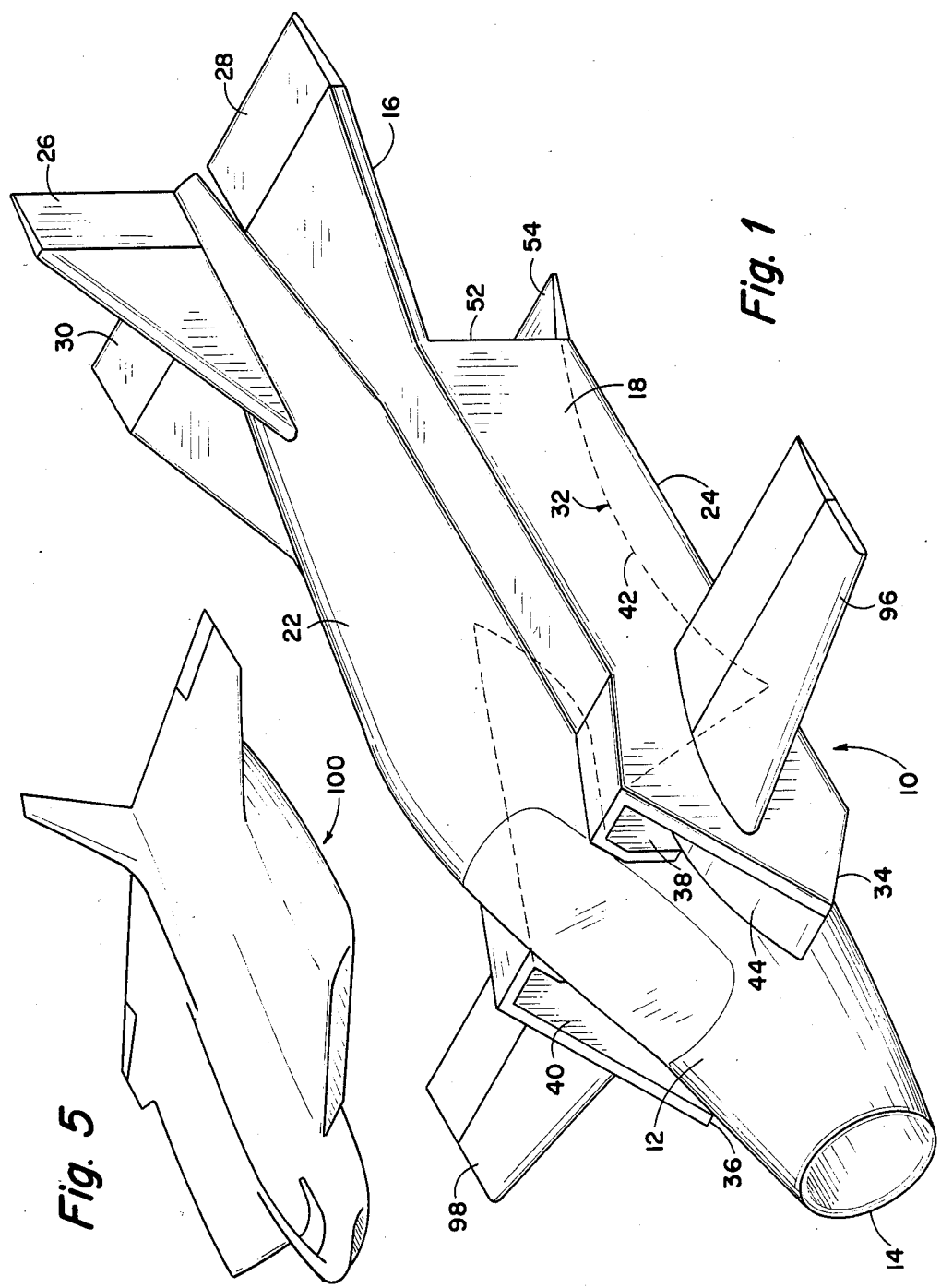
FIG. 1 is a perspective view of an aircraft embodying the invention with portions shown in broken lines and particularly illustrates a single engine highspeed modification of the invention.
Figure 2:
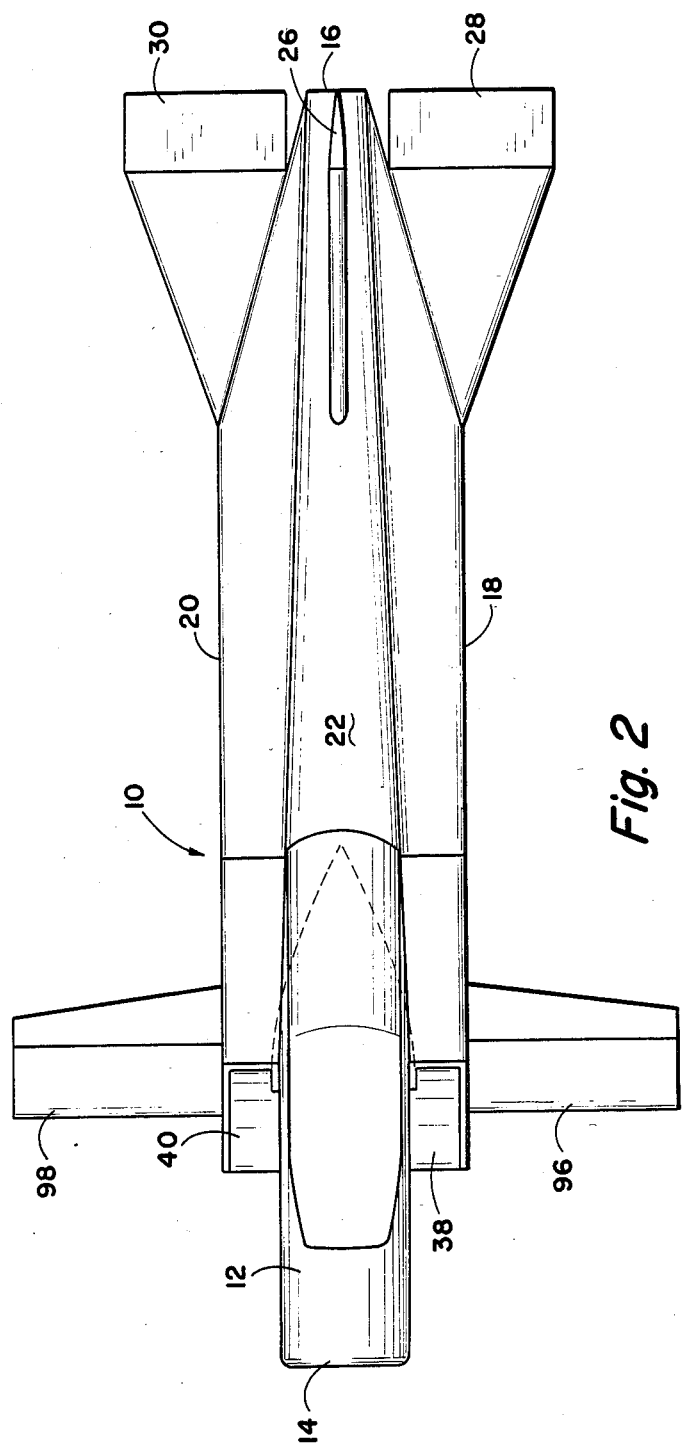
FIG. 2 is a plan view of the aircraft shown in FIG. 1.
Figure 3:
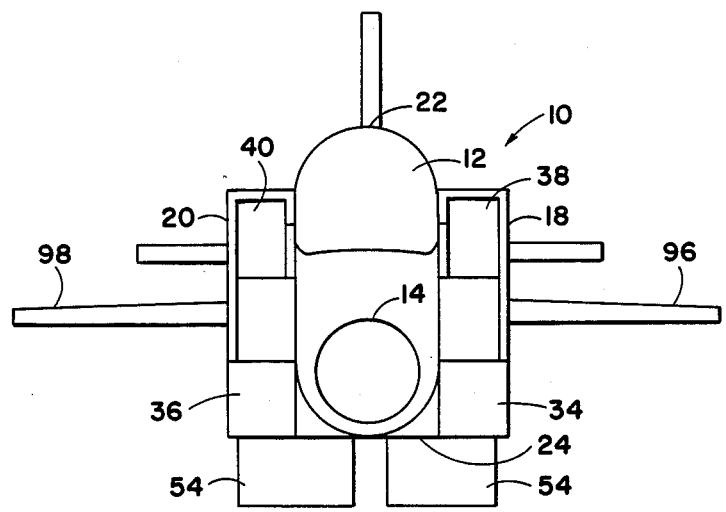
FIG. 3 is a front elevational view of the aircraft shown in FIG. 1.
Figure 4:
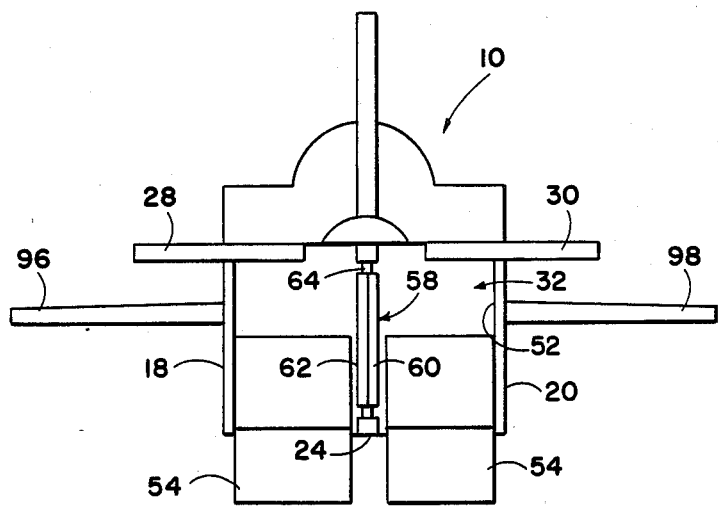
FIG. 4 is a rear elevational view of the aircraft shown in FIG. 1.
Figure 9:
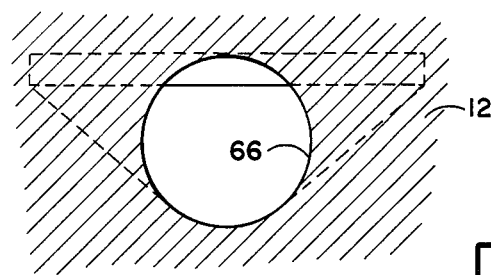
FIG. 9 is a view taken on line 9—9 of FIG. 8.

Referring to the drawings in detail, and particularly FIGS. 1 through 4 and 9 through 13, reference character 10 generally indicates an internal wing aircraft comprising a fuselage 12 having a forward end 14, a rear end 16, a first side 18, a second side 20, a top 22 and a bottom 24, the connotations top and bottom being used to generally indicate the uppermost and lowermost surface of the aircraft 10 when the aircraft is in substantially level flight, or in a stationary mode. A vertically disposed control surface 26 is provided at the rear of the aircraft 10, and left and right hand control surfaces 28 and 30 are disposed at the rear of the craft on the opposite sides of the vertical control surface 26, and are movable simultaneously, but in opposite directions, to produce a rolling movement about the longitudinal axis of the aircraft 10. An engine or suitable power plant (not shown) is mounted in the forward end 14 of the aircraft 10 in any suitable manner as is well known and the power plant may be any type which produces a rearward air stream so as to provide thrust for the aircraft 10. Of course, suitable conventional landing gear (not shown) may be provided for the aircraft, and conventional control devices (not shown) are provided for actuation of the control surfaces 26, 28 and 30 in the usual or well known manner.

A longitudinally extending internal air duct 32 is provided in the fuselage 12 of the craft 10, with the forward end of the duct 32 provided with openings 34 and 36 disposed on the opposite sides of the lower portion of the fuselage 12 and on opposite sides of the power plant or engine (not shown) of the craft 10. In addition, the duct 32 is provided with openings 38 and 40 disposed on the opposite sides of the upper portion of the fuselage 12 and on opposite sides of the engine (not shown). The floor or bottom 42 of the duct 32 is of an arcuate configuration, and the ports or openings 34–38 and 36–40 are separated by a centrally disposed baffle means 44. The upper surface of the baffle 44 provides a floor or bottom 46 for a passageway 48 which communicates between the duct 32 and the openings 38 and 40. The bottom or lower surface of the baffle means 44 provides a roof or upper surface 48 for the duct 32 at the ports 34 and 36, and the arcuate configuration of the duct floor 42 and the substantially flat or straight longitudinal configuration of the surface 48 converge to provide a reduced area or throat 50 in the duct 32 disposed rearwardly or aft of the openings 34 and 36. As the air stream moves through the ports or openings 34 and 36, the velocity thereof is increased by the configuration of the forward section of the ducts, and this increased velocity at the exit of the throat 50 creates a suction at the converging passageway 48 for drawing in ambient air through the ports 38 and 40. The combined airstreams then move rearwardly through the duct 32 for discharge through the open aft end 52 thereof.

Whereas the duct 32 as depicted herein is substantially uninterrupted throughout its length, it will be apparent that it may be desirable to provide a plurality of spaced vanes (not shown) secured to the floor 42 and extending inwardly into the duct 32 for controlling the direction of flow of the air stream moving through the duct to assure a most efficient utilization of the forces of the air stream during operation of the craft 10.

At least one movable flap means 54 is hingedly secured in any well known manner at the rear open end 52 of the duct which is selectively movable by the operator of the aircraft 10. In addition, it is preferable to provide a complimentary movable flap 56 secured substantially in the center of the open rear end 52 of the duct 32 and in spaced relation with respect to the flap 54. The flap 56 is movable simultaneously and in the same direction with the flap 54 to provide a vertical force along the trailing edge of the aircraft 10, thus changing the attitude of the craft, as is well known.

A vertically disposed vane means generally indicated at 58 is suitably mounted at the rear of the duct 32 to provide a directional control for the aircraft. The vane means 58 preferably comprises a pair of substantially identical vane members 60 and 62 having one vertical edge thereof pivotally secured to a common hinge or pivot shaft 64 whereby the vales 60 and 62 may be selectively moved either together in common directions or in directions toward and away from each other in much the same manner as butterfly wings to achieve directional control of the aircraft 10.

Figure 8:
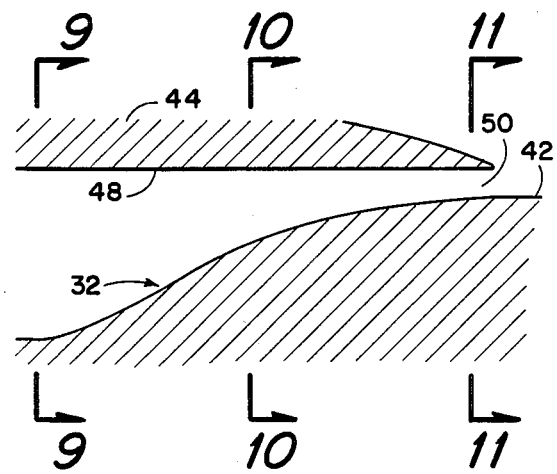
FIG. 8 is a cross sectional longitudinal view of a portion of an internal duct of an aircraft embodying the invention.
Figure 10:
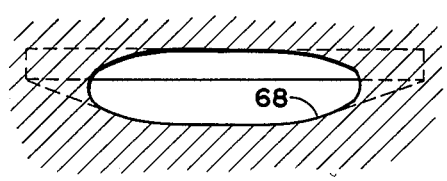
FIG. 10 is a view taken on line 10—10 of FIG. 8.
Figure 14:
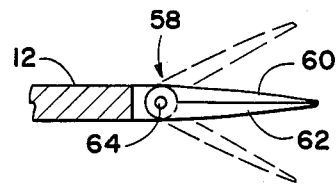
FIG. 14 is a view taken on line 14—14 of FIG. 6, with one operational position shown in solid lines and another operational position shown in broken lines for purposes of illustration.
Figure 11:
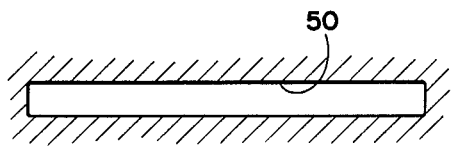
FIG. 11 is a view taken on line 11—11 of FIG. 8.
Figure 15:
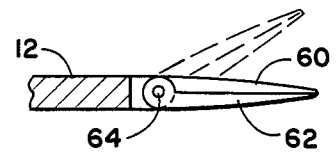
FIG. 15 is a view similar to FIG. 14 illustrating another operational position in broken lines.

Referring now more particularly to FIGS. 8 through 11, a broken sectional elevational view of the leading or forward portion of the duct 32 is shown, with FIG. 8 being a longitudinal sectional view therof. The cross sectional configuration of the duct 32 at the leading edge or opening 34 and 36 is substantially circular shown at 66 in FIG. 9. The cross sectional configuration of the duct 32 flattens or becomes substantially ovate as the duct progresses in the direction of the throat 50, the ovate configuration being shown at 68 in FIG. 10. The cross sectional configuration of the throat 50, as shown in FIG. 11, is substantially rectangular. This gradiation of the configuration of the duct 32 controls the movement of the air stream between the openings 34 and 36 and the throat 50 whereby the speed of the air stream is increased as it exits the throat, as hereinbefore set forth.

Figure 13:
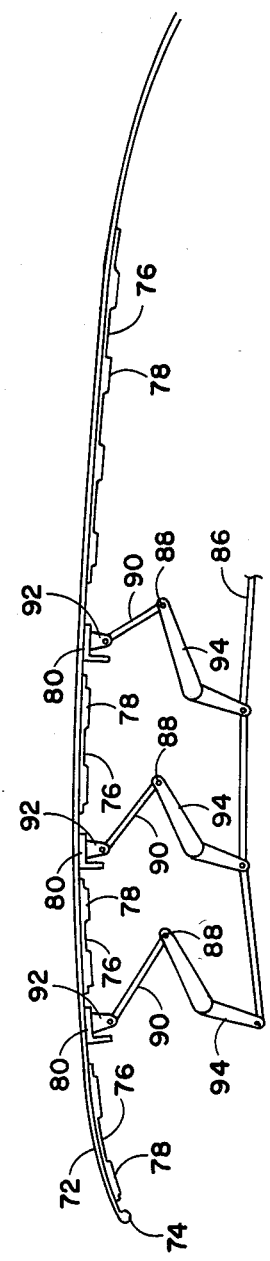
FIG. 13 is a view similar to FIG. 12 illustrating another operational mode of the contour control means.

Referring now to FIGS. 1 and 13, contour control means generally indicated at 70 is suitably secured below the floor 42 of the duct 32 and is utilized for altering the contour of the floor 42 in order to alter the peripheral configuration of the duct 32. The contour control means comprising a suitable plate or metallic sheet 72 may form a portion of the floor 42 and the forward end of the plate 72 may be pivotally secured at 74 to the fuselage of the aircraft. The plate 72 extends toward the rear end of the fuselage and terminates at a trailing edge in the proximity of the open rear end 52 of the duct 32. A plurality of guide rods (not shown) may be secured to the fuselage in any well known manner adjacent the trailing edge of the sheet 72 for supporting the plate 72 and facilitating guiding of a forward and rearward movement of the plate 72 during actuation of the apparatus 70. A plurality of suitable stiffening members 76 are secured to the under side of the plate 72, and are preferably provided with spaced slat members 78 extending transversely thereacross. A plurality of angle members 80 are interposed between adjacent or succeeding pairs of stiffening members 76 and extending transversely across the under side of the plate 72 for cooperating with the stiffening members 76 to provide sufficient rigidity for the sheet 72 to transmit lift produced thereby in conjunction with the roof or upper surface 82 of the duct 32 to the fuselage of the aircraft 10 while concurrently permitting longitudinal flexing of the sheet 72. The flexing or changing of the contour of the sheet 72 varies the chamber of the floor 42 whereby variable lift capacity is provided for the aircraft 10.

A plurality of contour control devices generally indicated at 84 are pivotally secured between each of the angle members 80 and a longitudinally extending push rod 86. The contour control devices are preferably substantially identical, with the exception of the dimensions thereof, and each comprises a transversely extending pivot shaft 88 secured to the fuselage 12 in any suitable manner for rotation about its own longitudinal axis. A first link member 90 has one end pivotally secured to the shaft 88 and the opposite end pivotally secured to a flange 92 secured to the respectively angle members 80. A bell crank assembly 94 has one end pivotally secured to the pivot shaft 88 and the opposite end pivotally secured to the push rod 86. The push rod 86 is operably connected to a suitable actuating mechanism (not shown) such as a hydraulic cylinder (not shown) for selective reciprocation of the push rod in forward and aft directions. As the push rod 86 moves in one direction, the contour control devices are actuated for altering the contour of the sheet 72 in such a manner as to provide a desired arcuate configuration therefor, such as that shown in FIG. 12. As the push rod 86 moves in another direction, the contour control devices are actuated for changing the contour of the sheet 72 to provide another configuration therefor, such as that shown in FIG. 13. This action alters the chamber of the floor 42 of the duct 32 thus altering the configuration of the inner periphery of the duct 32 in order to provide a control of the lift created by the air stream passing through the duct.

Whereas the aircraft 10 shown in FIGS. 1, 2, 3 and 4 is provided with a pair of oppositely disposed outwardly extending relatively small wings 96 and 98, the aircraft 100 shown in FIG. 5 and the aircraft 102 and 104 shown in FIGS. 6 and 7 are not provided with external wings. The lifting force in the craft 100, 102 and 104 is attained entirely by the internal duct system 32 as hereinbefore described. The novel aircraft design lends itself to an efficient single engine or multiple engine design as desired. As shown in FIG. 6, an engine or power plant 106 is mounted in the forward portion of the craft as in the case of the aircraft 10 hereinbefore set forth. The aircraft 104, as shown herein, may be provided with at least two such engines (not shown) if desired. In addition, the novel aircraft design may be utilized in the construction of large transport of cargo aircraft with equal efficiency and economy of operation and construction.

The lift for the aircraft 10 is generated by the action of air moving through the duct 32. The duct directs the airflow from the forward inlets 34 and 36 to the rearward outlet 52 for discharge at the rear of the craft. The movement of the air stream moving over the contoured section of the floor 42 creates a pressure and velocity change in the air stream. The configuration of the duct is such that a lower pressure is created on the floor or bottom surface 42 of the duct than is created on the upper surface 82 of the duct. The net difference in the pressure change results in an upward force or lift. This force is controlled by the shape of the duct or configuration of the inner periphery of the duct and by the amount of air that moves through the duct.

The configuration of the duct is altered by the contour control mechanism 70 which not only varies the configuration or contour of the floor 42 of the duct 32, but also varies the height of the duct, or the distance between the floor 42 and upper surface 82 of the duct. As the airspeed is increased through the duct 32, less curvature height is needed to generate the desired vertical force acting against the surface 82. Conversely, as the airspeed is decreased, more curvature height is required to maintain the required vertical force or lift. Of course, the duct size must be sufficiently great so as to permit the air flow through the contoured section of the duct without undue restriction of the movement of the air stream with the contoured section is configured with the greatest or highest curvature for the floor 42. Similarly, the size of the duct cannot be so large that the air stream is allowed to pass through the duct 32 without being properly influenced by the contoured section. The actual particulars of the duct shape and size are dependent on the considerations controlling the detail design of the aircraft for its anticipated mission requirements. The operation of the duct and the contained contoured section provide the characteristics necessary to fulfill the fundamental requirements for producing a lifting force for the aircraft.

It will be readily apparent from the drawings that the plane of the inlets 34 and 36 of the duct 32 are angularly disposed with respect to the direction of the incoming airflow. The duct inlets 34 and 36 are sensitive to this angular alignment, as is well known in the nature of inlets in general. The larger the angular misalignment, the larger the losses in airflow properties as the air stream enters the ducts 32 and begins its movement through the duct. The radius size of the circular inlet portion 66 is to control and minimize the sensitivity of the respective inlet to this misalignment. There are some small practical limits to this consideration, and this is the reason for the incorporation of the usual pitch-attitude control which is much like that of a conventional aircraft, except that the utilization of the pitch-attitude control is more like a trimming device than a major control device. The pitch control is provided by the flaps 28 and 30 and 54. When these flaps are operated in conjunction with each other simultaneously and in the same direction, a vertical force is produced along the trailing edge of the aircraft 10, thus changing the attitude of the craft. Of course, this attitude change may be controlled or monitored by the pilot in order to adjust the alignment of the aircraft with the incoming airflow.

Similarly, the directional control of the aircraft 10 may be maintained by the pilot of the craft. The directional alignment of the duct 32 is less sensitive than the pitch alignment, although the directional alignment plays an important role in the efficiency of the duct 32 and is fundamental to the maneuvering of the craft to a desired position or place. The vertically mounted vanes 60 and 62 disposed at the rear opening 52 of the duct 32 provide the necessary side force to produce a yawing movement of the craft. Of course, for low speed operations, the external vertically disposed vane or control surface 26 is provided for operation in conjunction with the vanes 60 and 62.

The rolling control of the craft is accomplished by the utilization of the flaps 54 and 28 and 30. It is preferable that the flaps 54 and 28–30 be arranged in cooperating left and right hand pairs, with one of each pair being disposed above the other. The upper and lower flaps or control surfaces of the right hand pair may be moved together, and the upper and lower flaps of the left hand pair may be similarly moved together but in opposite directions with respect to the movement of the right hand pair. This "split movement" feature produces a rolling movement about the longitudinal axis of the aircraft 10, and modulation of the operation of these control surfaces will enable the pilot to bank, roll, and otherwise maneuver the craft 10 in much the manner as a conventional aircraft. Of course, as hereinbefore set forth, all of the control vanes and/or surfaces are operably connected in any suitable or well known manner (not shown) for actuation by the pilot of the craft.

The function of the duct 32 is based on the amount of air moving through the contoured section thereof to produce the desired vertical force for the particular flight conditions of the aircraft 10. The movement of the air stream through the duct 32 is the result of energy that is supplied to the air stream by the aircraft and its systems. This energy is supplied by moving the craft through the air or by pumping the air through the duct by some mechanical means. When all of the airflow is produced by the forward movement or velocity of the aircraft, the performance of the craft will be dependent solely upon the power available to move the craft through the air. When the air stream is pumped through the duct 32, the performance of the duct and the craft are greatly enhanced. Pumping of the air may be accomplished in any suitable manner, such as by utilization of a pumping fan, or the like, (not shown) which may be disposed at either the intake or outlet end of the duct. Under these conditions, more energy is usually available when the fan is utilized to produce a pressure rather than to produce suction. In other words, it may be expedient to place the fan at the inlet of the duct rather than the outlet thereof.

The pumping of the air through the duct 32 may also be accomplished by pumping a percentage of the air stream through the duct at higher pressure and entraining the remaining air by viscous action, which is the principle of a jet pump. In the aircraft 10 this is accomplished by diverting the air from the power plant or engine (not shown) of the craft 10 into the inlets 34 and 36 of the duct 32 and discharge the air stream through the outlet end 52 thereof. The air stream entering the inlets 34 and 36 moves to the throat area 50 where the velocity of the air stream is increased and as the air stream exits through the throat 50, ambient air is pulled into the duct 32 through the inlets 38 and 40. The generation of a lifing force by flowing air through an internal passage, such as the duct 32, is dependent upon the shaping of the passageway itself, and the utilization of the contoured floor portion 42 is much like the upper surface of an airfoil configuration wherein a velocity change is created in the air as it passes through the duct. Since the shaping is primarily on the floor 42 of the duct 32, the largest velocity change occurs along the floor 42 and a lesser velocity change occurs along the roof or upper surface 82 of the duct 82.

Proportional to the changes in velocity along the length of the duct 32, the pressure acting on the floor 42 and the roof 82 is reduced. The pressure along the floor 42 is reduced more than the pressure along the roof 82, thereby creating a pressure differential between the two surfaces. This pressure differential acts on the surface area of the contoured portion of the floor 42 to create a vertical force in much the same way as does an external wing structure. The relationship between the pressure change in the air stream passing through the passageway or duct 32 and the shape of the inner periphery of the duct 32 is directly related to the co-ordinate dimensions of the contour size and shape, and this relationship is well defined and computable by conventional and well known methods. In the flying of an aircraft, lift has always been conventionally controllable by changes in the angle of attack, co-ordinated with an airspeed or change in airspeed of the craft. In the novel internal wing aircraft 10 the requirements are to produce a change in lift by changing the co-ordinate dimensions of the contoured section for the given airspeed or change in airspeed, and this is accomplished by the actuation of the control device 70. The effects of pitch attitude are not the same in the aircraft 10 as in conventional external wing aircraft and are not utilized in the production of lift in the craft 10.

Figure 12:
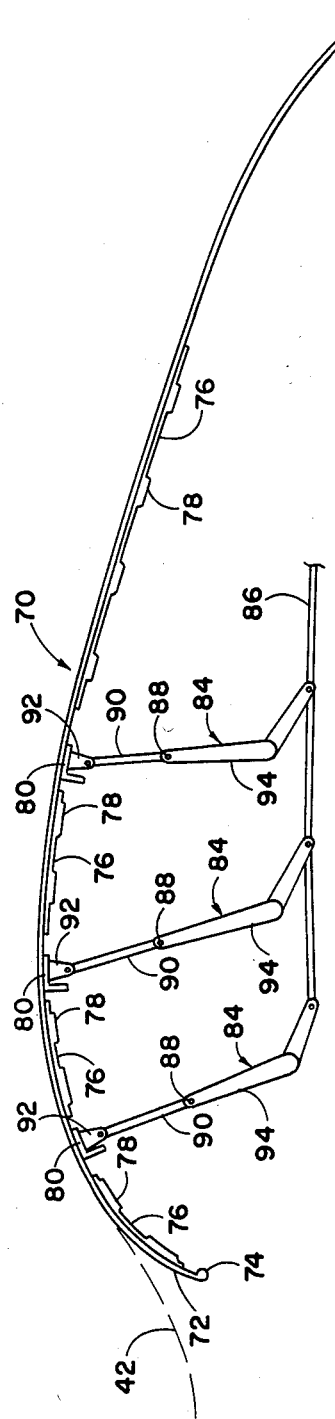
FIG. 12 is a view of the means for controlling the contour of the duct in an aircraft embodying the invention, and illustrates on operational mode thereof.

The mathematics surrounding the calculations of the velocity ratios at each given contour point are based on the conformal transformations of the co-ordinate airflows. As an example of the effects of the contour of the floor 42 on the velocity of the air stream passing over it, a comparison between a low curvature surface may be made. The low curvature surface, such as shown in FIG. 13, may be considered for high speed low lift flight conditions for the aircraft 10, whereas the high curvature surface as shown in FIG. 12 may be considered for low speed high lift flight. The velocity relationship of airflow along the upper surface 82 of the duct 32 is heavily dependent on the airflow itself. At low speeds, the difference between the upper surface velocity and the lower surface velocity is small. As the velocity of the airflow increases, the difference increases, and at high speeds the velocity along the upper surface 82 will be typically one-half to two-thirds that along the lower surface 42. Therefore, the reduction in pressure along the upper surface is typically between twenty-five percent and forty percent of the reduction along the lower surface. Between sixty and seventy-five percent of the lower surface pressure reduction can be utilized for lift at high speeds.

As hereinbefore set forth the configuration or contour of the inner periphery of the duct 32 is controlled by the contour control means 70, and as the airspeed is increased through the duct, less curvature height for the floor 42 is necessary to generate the desired vertical force or lift. Conversely, as the airspeed is decreased, the greater the curvature height required to maintain the required vertical force or lift for the aircraft.

From the foregoing it will be apparent that the present invention provides a novel aircraft utilizing an internal wing concept wherein an internal duct extends longitudinally through the fuselage of the aircraft and is provided with inlet means at the forward end thereof and outlet means at the aft end thereof. The air stream passing through the duct creates an upward force or lift for the craft and control vanes are provided for achieving the usual or desired operational characteristics for the craft generaly similar to more conventional external wing aircraft. The novel aircraft concept lends itself to application for single engine high speed operational craft, large transport or cargo craft, multi-engine craft or substantially any other desired inflight operational requirements.

What is claimed is:

1. An internal wing aircraft comprising a fuselage and power plant means, an internal duct having a floor providing an inner peripheral surface for the duct and a roof and extending longitudinally through the interior of the fuselage independently of the power plant means and having the forward end open at the forward portion of the fuselage to provide an inlet for receiving an airstream therethrough and the aft end open at the rear portion of the fuselage to provide an outlet for discharging the air stream therefrom, a plurality of movable control valves provided at the aft end of the duct for facilitating flight operational control of the aircraft, and means operably secured with the floor of the duct for selective variance of the contour of the inner peripheral surface of the floor for adjusting the contour thereof and the height of the duct without variance of the exterior of the aircraft.

2. An internal wing aircraft as set forth in claim 1 wherein the plane of the inlet is angularly disposed with respect to the direction of flow of the air stream.

3. An internal wing aircraft as set forth in claim 1 and including auxiliary inlet passage means providing communication between the exterior of the aircraft and the internal duct required of the inlet.

4. An internal wing aircraft as set forth in claim 3 wherein the cross sectional configuration of the duct at the inlet is substantially circular and varies progressively in a rearward direction to provide a throat area in the proximity of the conjunction between the duct and the auxiliary inlet passage means whereby the velocity of the air stream entering the inlet is increased for pulling ambient air through the auxiliary inlet passage for mixing with the air stream in the duct.

5. An internal wing aircraft as set forth in claim 1 wherein the inner peripheral surface of the floor is of an arcuate configuration for control of the speed of the air stream moving through the duct.

6. An internal wing aircraft as set forth in claim 1 wherein the movable control vanes comprise at least one flap means hingedly secured at the lower portion of the outlet of the duct and movable about an axis transverse with respect to the longitudinal axis of the aircraft.

7. An internal wing aircraft as set forth in claim 6 and including vane means secured in the outlet of the duct and pivotal about an axis substantially perpendicular to the axis of the said one flap means.

8. An internal wing aircraft as set forth in claim 7 wherein the vane means comprises a pair of substantially identical oppositely disposed vanes movable simultaneously in a common direction or simultaneously in opposite directions in accordance with the desired flight operation required for the aircraft.

9. An internal wing aircraft as set forth in claim 1 wherein the inlet of the duct is disposed inboard of the power plant means.

* * * * *